(12) United States Patent
Clephas et al.

(10) Patent No.: US 9,051,773 B2
(45) Date of Patent: Jun. 9, 2015

(54) ROLLO ASSEMBLY AND OPEN ROOF CONSTRUCTION FOR A VEHICLE PROVIDED THEREWITH

(71) Applicant: Inalfa Roof Systems Group B.V., Venray (NL)

(72) Inventors: Petrus Marinus Josephus Clephas, Sevenum (NL); Michael Cornelis Anthonius Relouw, Merselo (NL)

(73) Assignee: Inalfa Roof Systems Group B.V., Venray (NL)

( * ) Notice: Subject to any disclaimer, the term of this patent is extended or adjusted under 35 U.S.C. 154(b) by 80 days.

(21) Appl. No.: 13/859,877

(22) Filed: Apr. 10, 2013

(65) Prior Publication Data
US 2014/0130992 A1 May 15, 2014

(30) Foreign Application Priority Data
Apr. 12, 2012 (DE) ............ 20 2012 101 321 U

(51) Int. Cl.
*E06B 9/44* (2006.01)
*B60J 7/00* (2006.01)
*E06B 9/40* (2006.01)

(52) U.S. Cl.
CPC ............. *E06B 9/44* (2013.01); *B60J 7/0015* (2013.01); *E06B 9/40* (2013.01)

(58) Field of Classification Search
USPC ............... 160/370.22, 265, 322; 296/219
See application file for complete search history.

(56) References Cited

U.S. PATENT DOCUMENTS

| | | | |
|---|---|---|---|
| 3,829,154 A * | 8/1974 | Becknell | 296/98 |
| 4,909,563 A * | 3/1990 | Smith | 296/98 |
| 5,186,231 A | 2/1993 | Lewis | |
| 5,280,818 A * | 1/1994 | Ubelhart | 160/265 |
| 5,479,979 A * | 1/1996 | Hayashiguchi | 160/265 |
| 6,079,472 A * | 6/2000 | Schanz | 160/265 |
| 6,086,133 A * | 7/2000 | Alonso | 296/97.8 |

(Continued)

FOREIGN PATENT DOCUMENTS

| DE | 10110013 A1 | 9/2002 |
|---|---|---|
| DE | 102009038185 A1 | 2/2011 |

(Continued)

OTHER PUBLICATIONS

German Search Report from corresponding German Application No. 202012101321.5 filed Apr. 12, 2012.

*Primary Examiner* — Katherine Mitchell
*Assistant Examiner* — Justin Rephann
(74) *Attorney, Agent, or Firm* — Steven M. Koehler; Westman, Champlin & Koehler, P.A.

(57) ABSTRACT

A rollo assembly comprises a rollo screen with opposite longitudinal ends and opposite transverse ends, a winding shaft for winding and unwinding the rollo screen at one of said longitudinal ends, a pull beam connected to the other one of said longitudinal ends and two longitudinal guides for cooperation with the transverse ends of the rollo screen and for guiding the pull beam. At least one support member for the rollo screen extends underneath the rollo screen between two opposite longitudinal support member guides. The support member moves in said longitudinal direction along the support member guides when the rollo screen moves between its fully wound position and a partially wound off position, and is kept stationary in an end position when the rollo screen moves between its partially wound off position and its fully wound off position.

18 Claims, 5 Drawing Sheets

(56) References Cited

U.S. PATENT DOCUMENTS

| | | | |
|---|---|---|---|
| 6,152,517 A * | 11/2000 | Steadman | 296/107.01 |
| 6,206,449 B1 * | 3/2001 | Searfoss | 296/98 |
| 6,536,829 B2 * | 3/2003 | Schlecht et al. | 296/97.4 |
| 6,857,693 B2 * | 2/2005 | Hattass et al. | 296/214 |
| 6,886,879 B2 * | 5/2005 | Nolan et al. | 296/100.12 |
| 7,059,651 B2 * | 6/2006 | Bohm et al. | 296/97.11 |
| 7,252,133 B2 * | 8/2007 | Bengtsson et al. | 160/265 |
| 8,056,601 B2 * | 11/2011 | Kirby et al. | 160/265 |
| 8,272,676 B2 * | 9/2012 | Bremer | 296/98 |
| 8,511,735 B2 * | 8/2013 | Lee | 296/97.4 |
| 8,579,005 B2 * | 11/2013 | Lee | 160/122 |
| 2003/0006630 A1 * | 1/2003 | Kralik et al. | 296/214 |
| 2004/0040675 A1 * | 3/2004 | Siefert | 160/265 |
| 2005/0051283 A1 * | 3/2005 | Chatellard et al. | 160/265 |
| 2008/0036245 A1 * | 2/2008 | Koelbl et al. | 296/214 |
| 2008/0041536 A1 * | 2/2008 | Bengtsson et al. | 160/265 |
| 2009/0229770 A1 * | 9/2009 | Kirby et al. | 160/239 |
| 2011/0042996 A1 * | 2/2011 | Demma | 296/98 |
| 2012/0261939 A1 * | 10/2012 | Schmeichel et al. | 296/98 |

FOREIGN PATENT DOCUMENTS

| | | |
|---|---|---|
| DE | 102011050109 A1 | 4/2012 |
| EP | 0669447 A1 | 2/1995 |

* cited by examiner

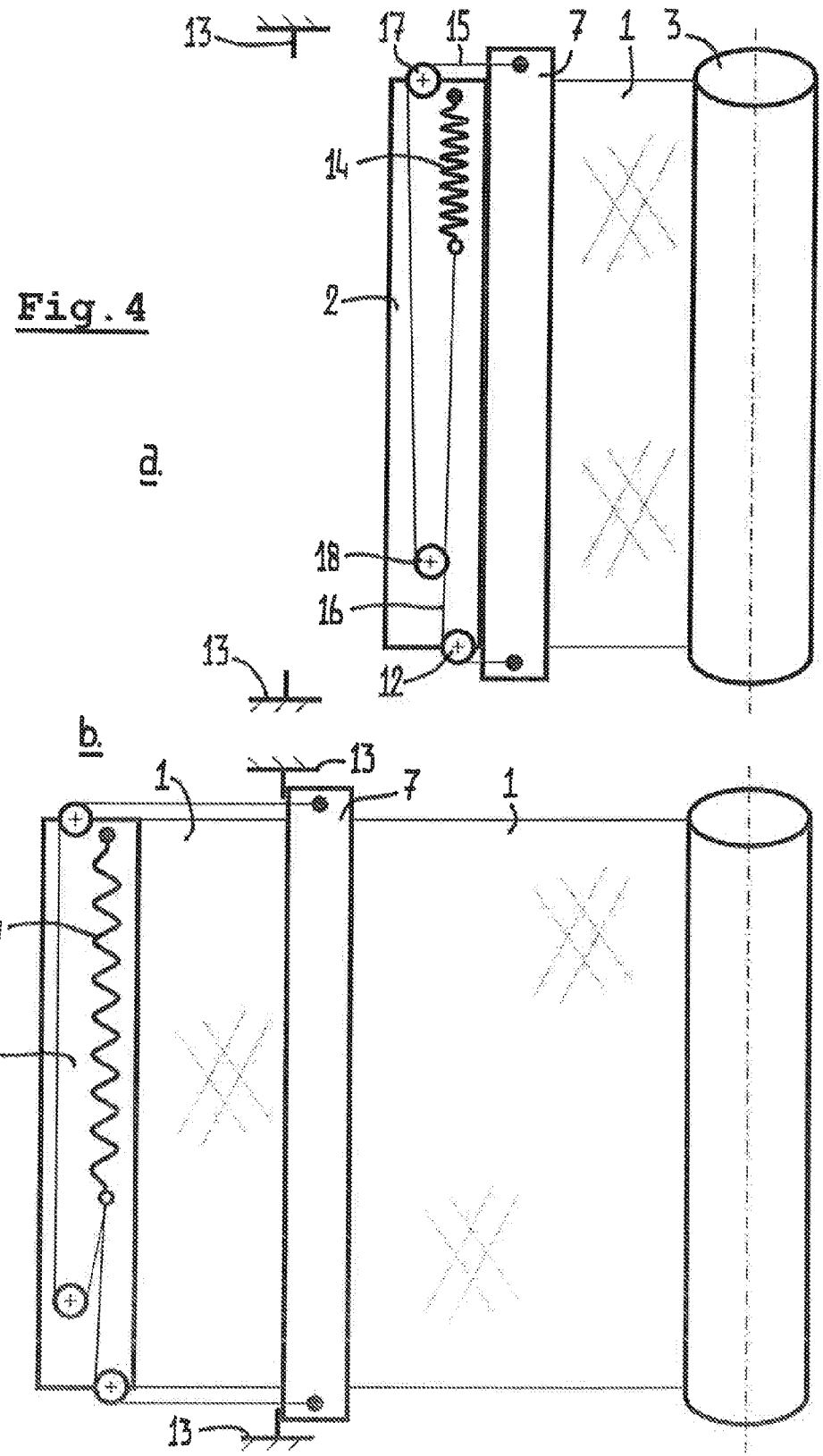

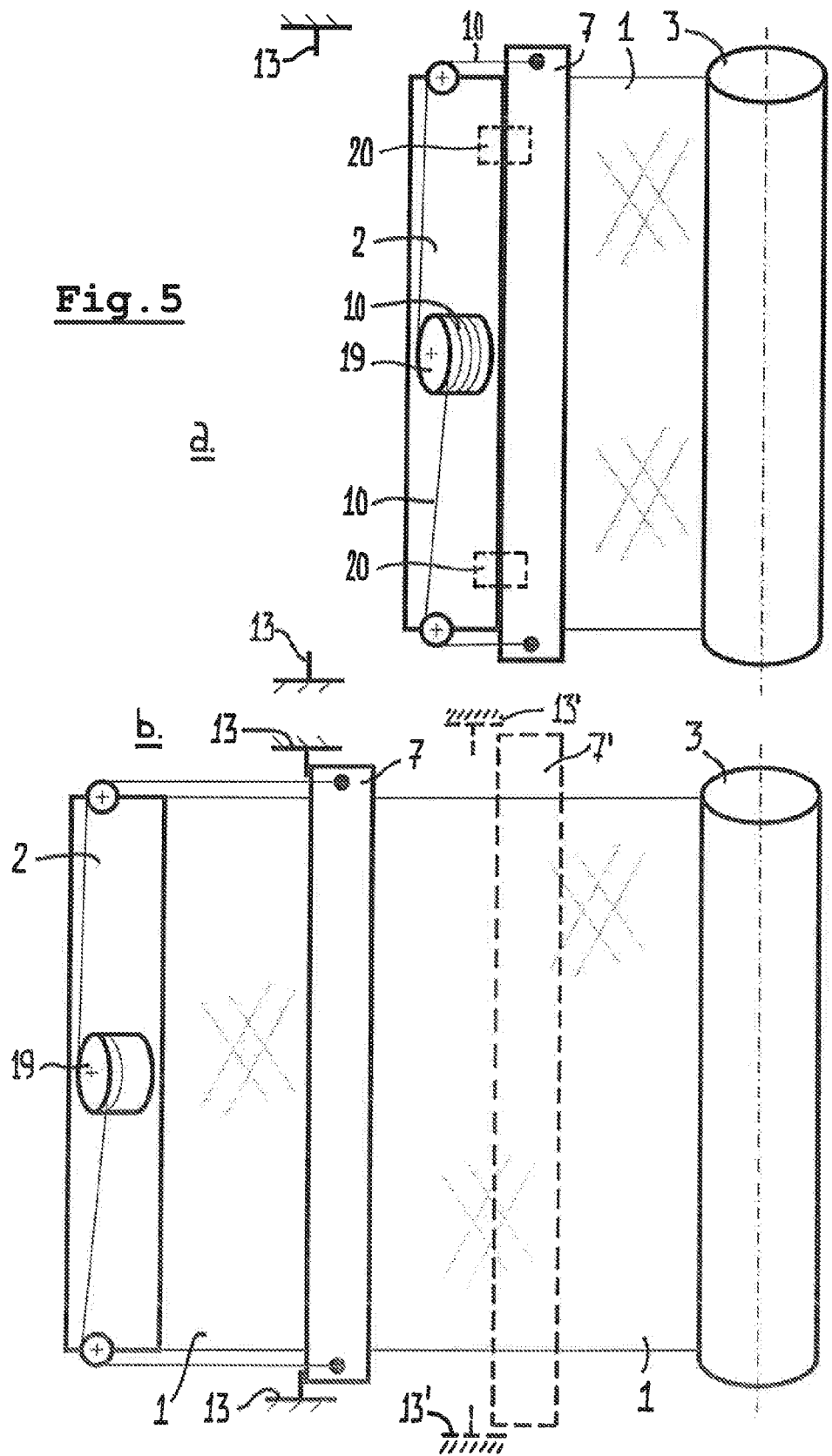

ROLLO ASSEMBLY AND OPEN ROOF CONSTRUCTION FOR A VEHICLE PROVIDED THEREWITH

BACKGROUND

The discussion below is merely provided for general background information and is not intended to be used as an aid in determining the scope of the claimed subject matter.

Aspects of the invention relate to a rollo assembly, comprising a rollo screen with opposite longitudinal ends and opposite transverse ends, a winding shaft for, in a longitudinal direction, winding and unwinding said rollo screen at a first one of said longitudinal ends, a pull beam connected to the other one of said longitudinal ends and two longitudinal guides for cooperation with the transverse ends of the rollo screen and for guiding opposite ends of the pull beam.

A well-known problem with such rollo assemblies is that the rollo screen may sag in its central region between the opposite longitudinal guides. With increasing dimensions of the rollo screen this problem will increase too.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

According to an aspect of the present invention a rollo assembly is provided with at least one support member for the rollo screen extending underneath the rollo screen between two opposite longitudinal support member guides, which support member is movable in said longitudinal direction along the support member guides in such a manner that it moves along with the rollo screen when latter moves between its fully wound position and a partially wound off position, and is kept stationary in an end position when the rollo screen moves between its partially wound off position and its fully wound off position.

The end position of the support member may be chosen in accordance with a desired result. For example said position may be chosen in such a manner that the supporting effect of the support member is optimised (it is conceivable that the support member in its end position will be located substantially halfway the fully extended length of the rollo screen) or also for coping with visual effects (the support member may additionally be used to improve esthetical features of the rollo assembly).

In one embodiment of the rollo assembly, the end position of the support member is defined by stationary stops engaging the support member. Such stationary stops, for example, may engage the outer ends of the support member near to the support member guides.

In one embodiment of the rollo assembly, the support member is connected to the pull beam by a spring assembly. Such a spring assembly, at one hand, ensures that the support member will move along with the rollo screen when latter moves between its fully wound position and a partially wound off position, and, on the other hand, allows the support member to be kept stationary in its end position when the rollo screen moves between its partially wound off position and its fully wound off position (and the distance between the pull member and the support member increases).

It is conceivable that the spring assembly comprises a flexible member, such as a wire, cable or rope, that with a first end is connected to the support member and that with a second end is connected to a spring member carried by the pull beam and loading the flexible member for pulling the support member towards the pull beam.

Such a spring member may be a tension spring, but other embodiments thereof are conceivable too, such as but not limited to a spring loaded winding member for the flexible member.

When, in accordance with another embodiment of the rollo assembly according to the present invention the flexible member extends around at least one pulley mounted on the pull beam, it is possible to use the length of the pull beam for positioning the spring member (said length generally being much larger than the width seen in the longitudinal direction—of said pull beam and thus offering more room for a spring member).

In one embodiment, the rollo assembly is provided with two flexible members connected to opposite ends of the support member. As a result symmetrical forces are applied to the support member, reducing the risk of jamming thereof, for example in its associated support member guides.

Whereas basically the use of such a spring assembly provides a permanent (although variable length) connection between the support member and the pull beam, in an alternative embodiment of the rollo assembly the support member is connected to the pull beam in a detachable manner. One possible embodiment provides that the support member is connected to the pull beam by magnets. When the support member has reached its end position (for example by engaging stationary stops) and the pull beam moves further in the longitudinal direction (for unwinding the rollo screen from the winding shaft), the magnets will disengage and the support member is disconnected from the pull member. When the pull beam again will approach the support member (by moving in an opposite sense along said longitudinal direction for winding the rollo screen onto the winding shaft), the magnets again will engage and the connection between the pull beam and support member will be re-established.

Both the pull beam and support member or only one thereof may be provided with such magnets.

In another embodiment a support member guide and a respective longitudinal guide are combined into a single guide. As such, the design may be optimised by reducing the number of its parts.

In another embodiment the rollo assembly according to the present invention is provided with at least two support members with different end positions in said longitudinal direction. Each support member then, for example, may cooperate with different stationary stops.

In a second aspect the invention relates to an open roof construction for a vehicle, comprising a roof opening in a stationary roof and provided with an embodiment of a rollo assembly herein described. The open roof construction may comprise one or more panels of any type.

In one embodiment such an open roof construction comprises at least two glass panels cooperating with said roof opening and together defining a visible transverse line of transition between successive glass panels, wherein substantially vertically below each line of transition a support member is positioned in its end position.

The support member not only supports the rollo screen but also may be used to hide the transition line (or the shadow thereof) from sight, especially when the rollo screen is of a type which is partially transparent.

BRIEF DESCRIPTION OF THE DRAWINGS

Hereinafter aspects of the invention will be elucidated while referring to the drawing, in which:

FIG. 4 shows a second embodiment of the rollo assembly in two positions, and

FIG. 5 shows a third embodiment of the rollo assembly in two positions, while schematically indicating possible further embodiments thereof.

DETAILED DESCRIPTION OF THE ILLUSTRATIVE EMBODIMENTS

Figure 1:
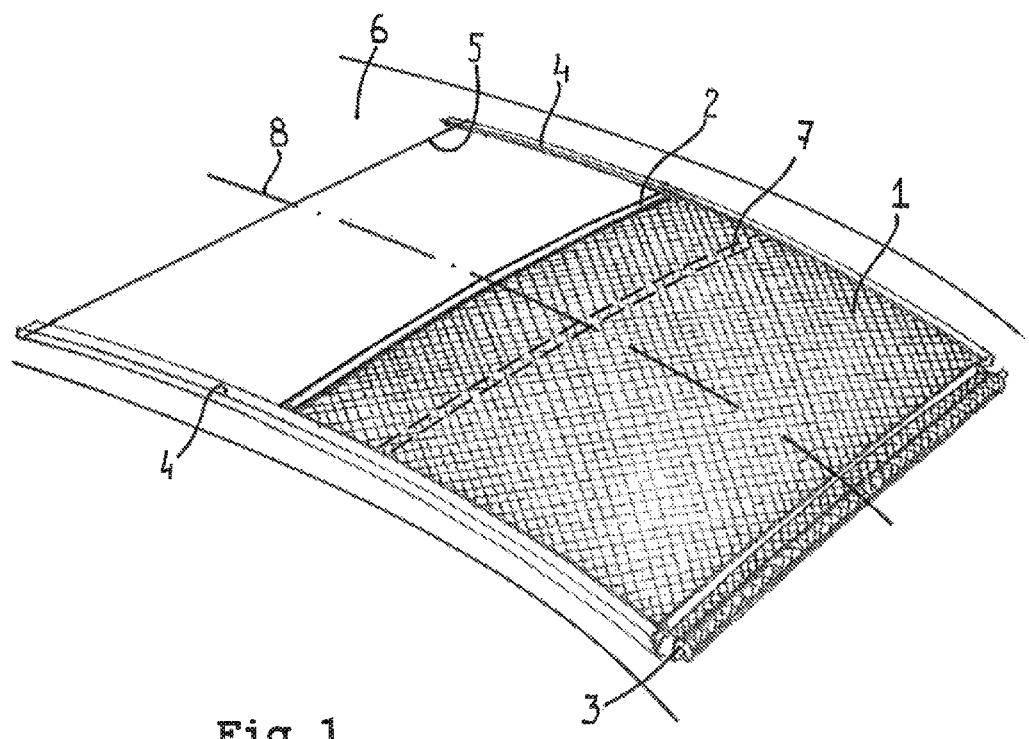
FIG. 1 schematically shows the basic concept of a rollo assembly.

Referring to FIG. 1, a rollo assembly comprises a rollo screen 1 with opposite longitudinal ends of which one is connected to a pull beam 2 and of which the other can be wound onto or unwound from a winding shaft 3. The rollo screen 1 further comprises opposite transverse ends which are guided in two longitudinal guides 4 which also are used for guiding opposite ends of the pull beam 2.

The rollo assembly may be part of a roof assembly for an open roof construction of a vehicle which further comprises a roof opening 5 provided in a stationary roof part 6 of the vehicle.

The illustrated rollo assembly comprises a support member 7 for the rollo screen 1 extending underneath the rollo screen 1 between two opposite longitudinal support member guides (which in the present case are identical to, or are integrated into, the longitudinal guides 4 but which, in an alternative embodiment, may comprise separate guides). In a manner to be described later, said support member 7 is movable in a longitudinal direction 8 along its guides 4 in such a manner that it moves along with the rollo screen 1 when latter moves between its fully wound position and a partially wound off position, and is kept stationary in an end position when the rollo screen 1 moves between its partially wound off position and its fully wound off position.

Figure 2:
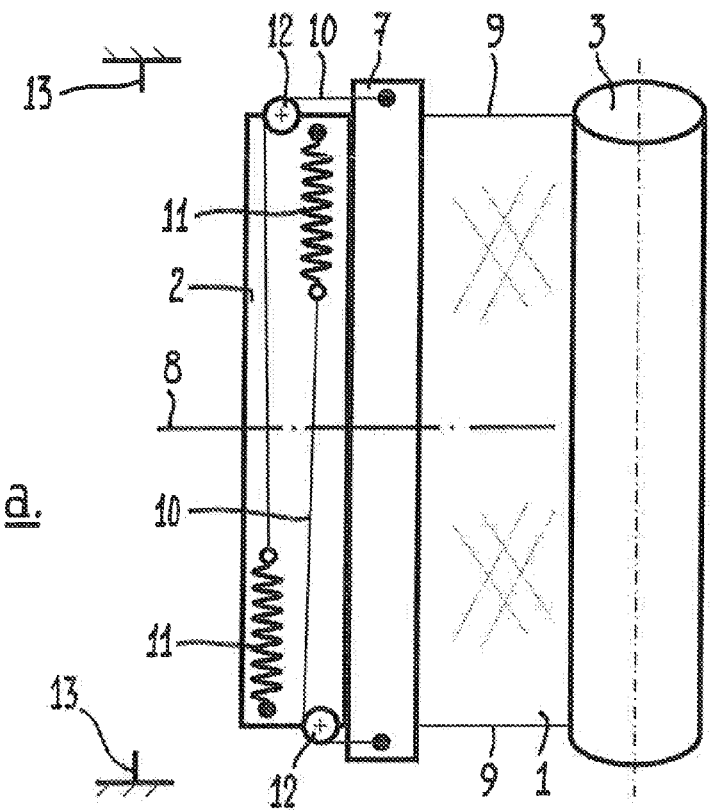
FIG. 2 shows a first embodiment of the rollo assembly in two positions.
Figure 2:
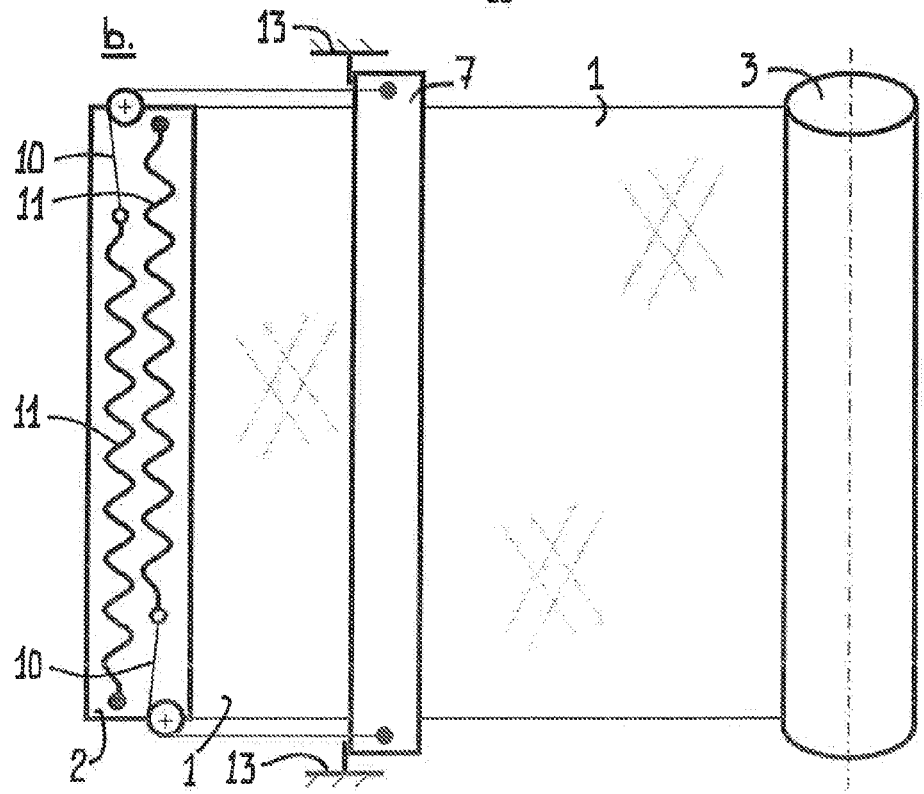

FIG. 2 schematically illustrates an embodiment of the rollo assembly in a top plan view. The guides 4 have not been shown in this view but the transversal edges 9 of the rollo screen 1 now are visible.

In this embodiment the support member 7 is connected to the pull beam 2 by a spring assembly which comprises two flexible members 10, such as wires, cables, ropes or alike, that with a first end are connected to the support member 7 and that with a second end are connected to a spring device, herein a tension spring 11 carried by the pull beam 2. As a result the flexible members 10 are loaded for pulling the support member 7 towards the pull beam 2.

In the illustrated embodiment the flexible members 10 each extend around a pulley 12 mounted on the pull beam 2.

The rollo assembly further comprises stationary stops 13 which are meant to engage the support member 7 for defining an end position thereof (FIG. 2b) when the rollo screen 1 is wound off the winding shaft 3 (for example by pulling the pull beam 2 in the longitudinal direction 8).

When the rollo screen 1 moves between its fully wound position and a partially wound off position (FIG. 2a) the support member 7 is kept into engagement with the pull beam 2 by the tensioned flexible members 10 and moves along therewith. After reaching its end position (defined by the stationary stops 13) the support member 7 stops moving while the rollo screen 1 moves further between its partially wound off position and its fully wound off position (FIG. 2b).

Figure 3:
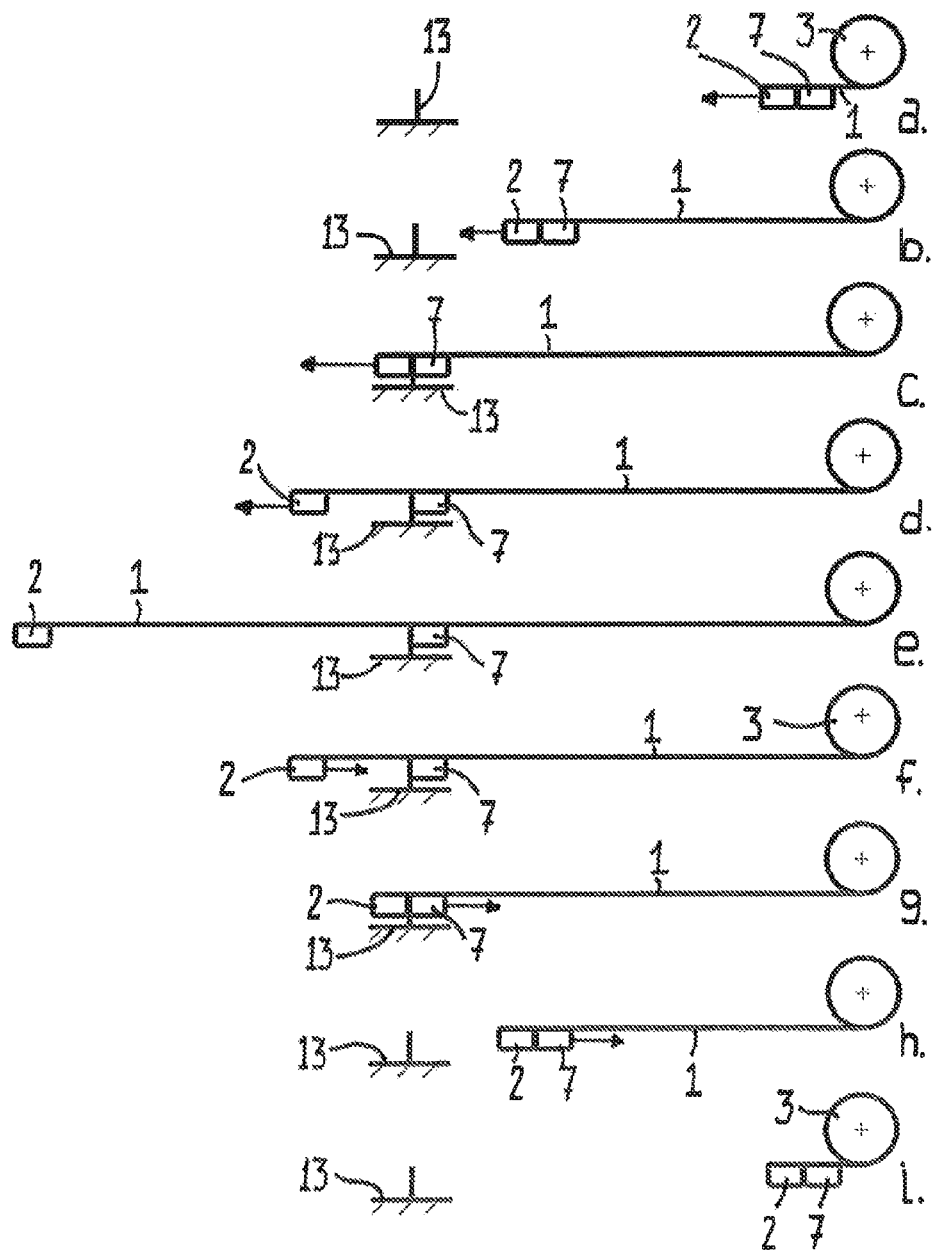
FIG. 3 illustrates the function of the rollo assembly.

The process of unwinding the rollo screen 1 from the winding shaft 3 and moving it together with the support member 7 is illustrated schematically in FIG. 3. FIG. 3a shows the rollo screen 1 almost fully wound onto the winding shaft 3; in FIG. 3b the unwinding has started and in FIG. 3c the support member 7 engages the stationary stops 13. In FIG. 3d the rollo screen 1 and pull beam 2 move further while the support member 7 is kept stationary by the stops 13. FIG. 3e shows the fully unwound position of the rollo screen 1.

FIGS. 3f-3i show the process of again winding the rollo screen 1 onto the winding shaft 3. In FIG. 3g the pull beam 2 again has engaged the support member 7 and starts moving it along.

In the situations 3d-3f the tension springs 11 have been elongated with respect to their rest position in which the support member 7 engages (or is positioned most close to) the pull beam 2.

FIG. 4 illustrates an embodiment in which only one tension spring 14 is provided to which both flexible members 15 and 16 are connected. Flexible member 15 extends around two pulleys 17 and 18 for achieving such a configuration.

FIG. 5 illustrates an alternative embodiment in which the tension springs have been replaced by another spring device being a spring loaded winding member 19 for the flexible members 10.

FIG. 5a further schematically indicates a possible further alternative embodiment, using one or more magnets 20 for detachably connecting the support member 7 with the pull beam 2 (as an alternative for the spring assemblies). The magnet(s) 20 keep the pull beam 2 and support member 7 connected until the latter engages the stationary stops 13 and will be disconnected from the pull beam 2 when the pull beam 2 moves further. When the pull beam 2 will again move back, the magnet(s) 20 will reinstate the connected position between the pull beam 2 and support member 7.

FIG. 5b finally schematically indicates yet another alternative embodiment which comprises at least one additional support member 7' which, in a manner in correspondence with the above, cooperates with additional stationary stops 13'. The position of the stationary stops 13' is such that the support member 7 may freely pass these stationary stops 13' without engagement therewith. As a result each support member 7,7' will reach its own, separate end position as dictated by the respective stationary stops 13,13'. The number of support members may be increased as required.

The open roof construction illustrated in FIG. 1 may comprise at least two glass panels (21, 22) cooperating with said roof opening 5 (positioned above the rollo assembly) and together defining a visible transverse line of transition 23 between successive glass panels. The rollo assembly and specifically the position of the stationary stops 13, 13', may be designed in such a manner that substantially vertically below each line of transition a support member 7 may be positioned in its end position as defined by the respective stationary stops 13,13'. Thus the transition lines are hidden from view for improving the esthetical appearance of the entire assembly.

Although the subject matter has been described in language specific to structural features and/or methodological acts, it is to be understood that the subject matter defined in the appended claims is not necessarily limited to the specific features or acts described above as has been held by the courts. Rather, the specific features and acts described above are disclosed as example forms of implementing the claims.

The invention claimed is:

1. A rollo assembly, comprising:
   a single rollo screen with opposite longitudinal ends and opposite transverse ends;
   a winding shaft configured to, in a longitudinal direction, wind and unwind said single rollo screen at a first end of said longitudinal ends;
   a pull beam connected to a second end of said longitudinal ends;
   two longitudinal guides configured to cooperate with the transverse ends of the single rollo screen and guide opposite ends of the pull beam;
   two longitudinal support member guides; and
   a support member extending underneath the single rollo screen with opposite ends configured to cooperate with the longitudinal support member guides to guide the opposite ends of the support member in such a manner that the support member moves along with the single rollo screen when the single rollo screen moves between a fully wound position and a partially wound off position, wherein the support member is kept stationary in an end position when the single rollo screen moves between the partially wound off position and a fully wound off position, and wherein the support member is directly connected to the pull beam by a spring assembly having a spring device.

2. The rollo assembly according to claim 1, wherein the end position of the support member is defined by stationary stops engaging the support member.

3. The rollo assembly according to claim 1, wherein the support member is connected to the pull beam in a detachable manner.

4. The rollo assembly according to claim 3, wherein the support member is connected to the pull beam by magnets.

5. The rollo assembly according to claim 1, wherein the longitudinal support member guide and the longitudinal guide on each of the transverse ends are combined into a single guide.

6. The rollo assembly according to claim 1, and further comprising a second support member with opposite ends configured to slidably engage a respective longitudinal support member guide, wherein the second support member is kept stationary in a second end position when the single rollo screen moves between the partially wound off position and a fully wound off position.

7. The rollo assembly according to claim 6, wherein each support member cooperates with different stationary stops.

8. An open roof construction for a vehicle, comprising a roof opening in a roof which is stationary with respect to the vehicle and provided with a rollo assembly according to claim 1.

9. The open roof construction according to claim 8, comprising two glass panels cooperating with said roof opening and together defining a visible transverse line of transition between the glass panels, wherein substantially vertically below the transverse line of transition the support member is positioned in the end position.

10. A rollo assembly, comprising:
    a rollo screen with opposite longitudinal ends and opposite transverse ends;
    a winding shaft configured to, in a longitudinal direction, wind and unwind said rollo screen at a first end of said longitudinal ends;
    a pull beam connected to a second end of said longitudinal ends;
    two longitudinal guides configured to cooperate with the transverse ends of the rollo screen and guide opposite ends of the pull beam;
    two longitudinal support member guides; and
    a support member extending underneath the rollo screen with opposite ends configured to cooperate with the longitudinal support member guides to guide the opposite ends of the support member in such a manner that the support member moves along with the rollo screen when the rollo screen moves between a fully wound position and a partially wound off position, wherein the support member is kept stationary in an end position when the rollo screen moves between the partially wound off position and a fully wound off position, and wherein the spring assembly comprises a flexible member with a first end connected to the support member and a second end connected to the spring device carried by the pull beam and configured to load the flexible member to pull the support member towards the pull beam.

11. The rollo assembly according to claim 10, wherein the spring device is a tension spring.

12. The rollo assembly according to claim 10, wherein the spring device is a spring loaded winding member configured to wind the flexible member.

13. The rollo assembly according to claim 10, wherein the flexible member extends around at least one pulley mounted on the pull beam.

14. The rollo assembly according to claim 10, wherein the flexible member is connected to a first end of the support member, and wherein the spring assembly comprises a second flexible member with a first end connected to a second end of the support member and a second end of the second flexible member connected to the spring device carried by the pull beam and configured to load the second flexible member to pull the support member towards the pull beam.

15. The rollo assembly according to claim 10, wherein the flexible member is connected to a first end of the support member, and wherein the spring assembly comprises a second flexible member with a first end connected to a second end of the support member and a second end of the second flexible member connected to a second spring device carried by the pull beam and configured to load the second flexible member to pull the support member towards the pull beam.

16. A rollo assembly, comprising:
    a rollo screen with opposite longitudinal ends and opposite transverse ends;
    a winding shaft configured to, in a longitudinal direction, wind and unwind the rollo screen at a first end of said longitudinal ends;
    a pull beam connected to a second end of said longitudinal ends;
    two longitudinal guides configured to cooperate with the transverse ends of the rollo screen and guide opposite ends of the pull beam;
    two longitudinal support member guides; and
    a support member extending underneath the rollo screen with opposite ends configured to cooperate with the longitudinal support member guides to guide the opposite ends of the support member in such a manner that the support member is directly connected to the pull beam by a mechanism, separate from the rollo screen, and moves along with the rollo screen when the rollo screen moves between a fully wound position and a partially wound off position, and wherein the support member is kept stationary in an end position when the rollo screen moves between the partially wound off position and a fully wound off position; and wherein the mechanism remains connected to the pull beam and the rollo screen when the pull beam is in the fully wound off position and the support member is in the end position.

17. The rollo assembly of claim 16 wherein the mechanism includes a member having a portion that extends between the support member and the pull beam as the pull beam moves away from the support member.

18. The rollo assembly of claim 16 wherein the mechanism includes a spring configured to bring the pull beam and stationary support member together.

* * * * *